United States Patent
Schutz et al.

[11] Patent Number: 6,012,998
[45] Date of Patent: Jan. 11, 2000

[54] MODULAR PULLEY FOR CONTINUOUSLY VARIABLE TRANSMISSION

[75] Inventors: Martijn Arnoud Schutz, Tilburg; Sebastiaan Pieter Henricus Jozef Bongers, Nijmegen, both of Netherlands

[73] Assignee: Van Doorne's Transmissie B.V., Tilburg, Netherlands

[21] Appl. No.: 09/192,937

[22] Filed: Nov. 16, 1998

Related U.S. Application Data

[63] Continuation of application No. 08/753,730, Nov. 29, 1996, abandoned.

[30] Foreign Application Priority Data

Nov. 28, 1995 [NL] Netherlands .............................. 1001755

[51] Int. Cl.[7] .............................. F16H 55/56; F16H 7/20
[52] U.S. Cl. .............................................. 474/43; 474/199
[58] Field of Search .................................. 474/8, 11, 12, 474/17, 18, 25, 28, 43, 44, 199

[56] References Cited

U.S. PATENT DOCUMENTS

5,334,108  8/1994  Lamers ......................................... 474/8
5,676,612  10/1997  Schellekens et al. ..................... 474/28

FOREIGN PATENT DOCUMENTS

462637 A1  12/1991  European Pat. Off. .
462637 B1  9/1993  European Pat. Off. .
658709 A1  6/1995  European Pat. Off. .
2286321  4/1976  France .
3521314  1/1986  Germany .

*Primary Examiner*—Tamara L. Graysay
*Assistant Examiner*—Matthew A. Kaness
*Attorney, Agent, or Firm*—Young & Thompson

[57] ABSTRACT

A modularly constructed pulley for a continuously variable transmission, provided with at least two discs on a pulley shaft and/or sleeve of the pulley shaft, one or more discs fixed as individual components to the pulley shaft and/or sleeve, and having at least one disc which is axially displaceable, by, e.g., a piston/cylinder assembly with pistons or cylinders individually fixed to the disc.

23 Claims, 3 Drawing Sheets

6,012,998

MODULAR PULLEY FOR CONTINUOUSLY VARIABLE TRANSMISSION

CROSS-REFERENCE TO RELATED APPLICATIONS

This application is a continuation of application Ser. No. 08/753,730, filed Nov. 29, 1996 now abandoned.

BACKGROUND OF THE INVENTION

The invention relates to a pulley, in particular for a continuously variable transmission, provided with at least two discs on a pulley shaft and/or on a sleeve of the pulley shaft, at least one disc being axially displaceable by means of operating means.

DESCRIPTION OF THE RELATED ART

A pulley of this type is disclosed in, for example, U.S. Pat. No. 5,334,108 and is used in particular in continuously variable transmissions, especially for motor vehicles. In a continuously variable transmission two pulleys are always used with a drive belt between the discs of both pulleys. By relative displacement of the two discs of the pulley, for both pulleys simultaneously, the radial position of the drive belt between the pulleys and, thus, the transmission ratio can be adjusted. The pulley performs a large number of sub-functions which do not impose uniform requirements in respect of the design, the material and the nature of the surface, with the result that the option here is always for a compromise between the requirements instead of optimizing the pulley for all requirements. The pulley is consequently not only difficult to produce, but also expensive, complex and heavy.

SUMMARY OF THE INVENTION

The aim of the invention is to overcome the said drawbacks. The pulley according to the invention is characterised in that the pulley is of modular construction. As a result, each part of the pulley can be designed and produced in the optimum manner for the relevant sub-function and the choice of material and the nature of the surface can be matched to this. The pulley is, moreover, less heavy and less complex.

According to the invention, one or more discs can be mounted as an individual part on the pulley shaft and/or on the sleeve, in particular by means of a non-positive and/or positive connection. Both an optimum disc and an optimum shaft/sleeve can be obtained in this way.

Furthermore, the discs can be provided with contact surfaces individually fixed to the discs. Said contact surfaces can, for example, be optimized for the contact with the belt or with the shaft/sleeve.

The pulley shaft and/or the sleeve can also be provided with individually fixed contact surfaces which have been optimized for their mutual contact and/or that with the discs.

For the pulleys for which the operating means comprise one or more piston/cylinder assemblies, the disc and/or the pulley shaft and/or the sleeve can be provided with a cylinder and/or piston individually fixed to the disc, and/or the pulley shaft and/or the sleeve.

Furthermore, a cylinder individually fixed to the disc and a cylinder individually fixed to the pulley shaft or the sleeve can be connected in such a way that relative rotation is blocked. Moreover, the cylinder and/or the piston can be at least partially surrounded by a bearing of the pulley shaft or the sleeve.

Suitable fixings/connections are, in particular, press-fit, toothed and keyed joints as well as adhesive joints. Preferably, the adhesive joint is both strong and elastic in order to be able to withstand deformation. In the context of the dimensional tolerances, the adhesive joint is preferably no thicker than at most 10 $\mu$m. In order, for example, to prevent ingress of oil, the adhesive layer can be sealed off from the environment, for example by means of a silicone seal.

The invention will be explained with reference to a drawing. In the drawing.

Figure 1:
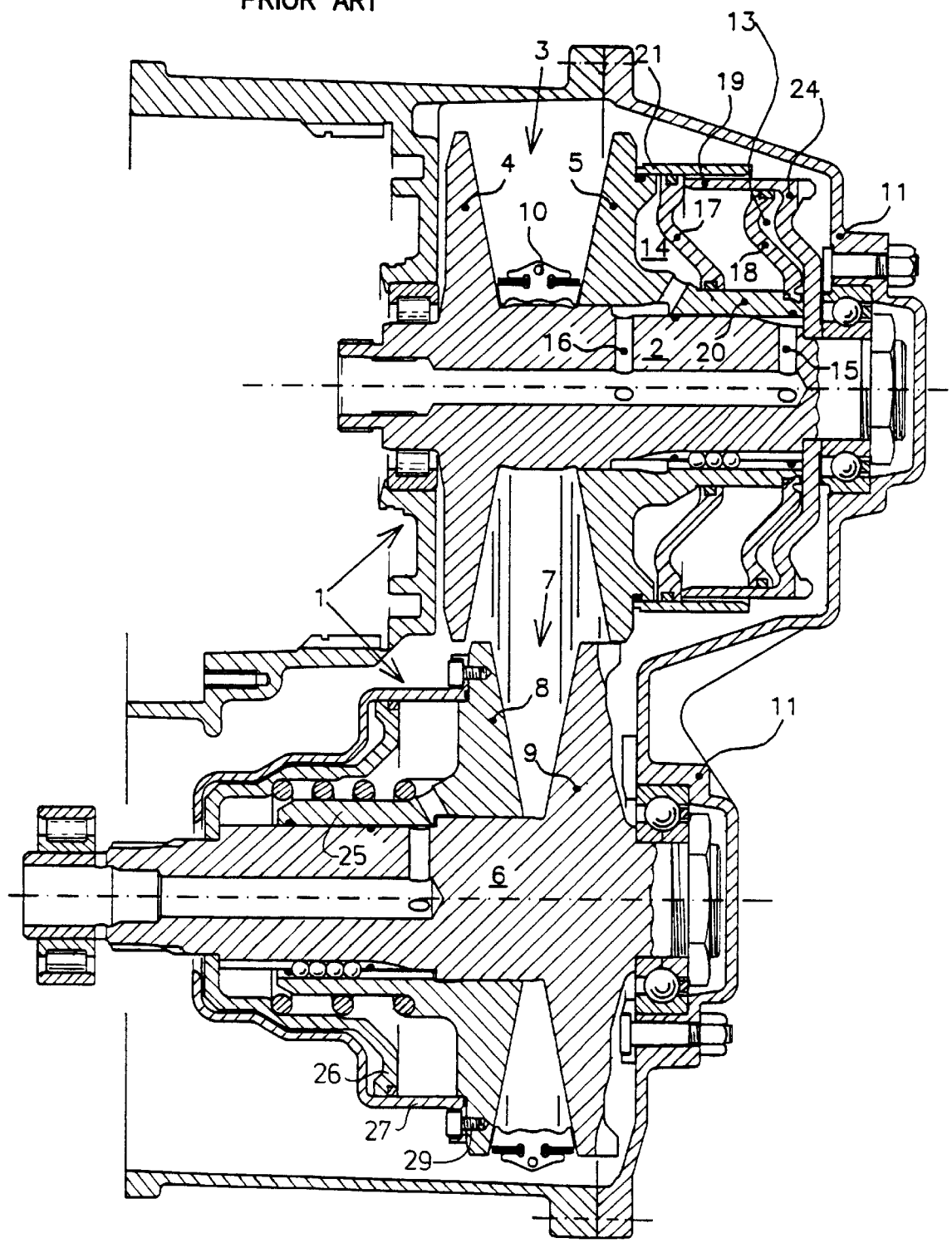
FIG. 1 shows, diagrammatically, a continuously variable transmission with pulleys according to the prior art.

The continuously variable transmission 1 shown diagrammatically in FIG. 1 is provided, inside the transmission housing 11, with two pulleys 3, 7 according to the prior art. The pulleys 3 and 7 respectively each comprise two discs 4, 5 and 8, 9, respectively, which are mounted on a primary pulley shaft 2 and, respectively, secondary pulley shaft 6. The discs 5 and 8 are axially displaceable, as a result of which the radial position of the drive belt 10 between the pulleys 3 and 7 can be changed and the transmission ratio can be adjusted. The axially displaceable discs 5 and 8 are provided with operating means in the form of piston/cylinder assemblies. The piston/cylinder assembly for disc 8 is a single piston/cylinder assembly 26, 27 and that for disc 5 is a double piston/cylinder assembly. The double piston/cylinder assembly comprises two cylinder chambers 13, 14. Cylinder chamber 13 is enclosed by the cylinder 19, the piston 18, the radial wall 24 and the shaft 2. Cylinder chamber 14 is enclosed by the cylinder 21, the piston 17, the disc 5 and the sleeve 20 of the pulley shaft 2, to which the disc 5 has been fixed.

Fluid can be fed through the holes 15 and 16 to and from the cylinder chambers 13 and 14, respectively, in such a way that the disc 5, together with the sleeve 20, is moved over the pulley shaft 2.

The pulleys 3 and 7 with the discs 4, 5 and 8, 9, respectively, the pulley shafts 2 and 6, respectively, and the sleeves 20 and 25, respectively, have to perform a large number of sub-functions, amongst which the following may be mentioned in particular:

guiding the drive belt.
  the transfer of torque between the drive belt and the discs.
  the transfer of a contact pressure onto the drive belt.
  guiding the displaceable discs.
  transfer of torque between the discs and the pulley shaft.
  coupling of the pulley shaft to the drive-line in the direction of an engine or in the direction of the wheels of the motor vehicle.
  feeding through fluid for the various hydraulic functions in the transmission.

In the pulleys according to the prior art, the discs 4 and 9 form a whole with the pulley shaft 2 and 6, respectively, and the discs 5 and 8 form a whole with the sleeve 20 and 25, respectively. This has the disadvantage that the various sub-functions have to be performed within one component, namely the shaft/disc or the sleeve/disc component. Within this framework, the design, the material, the heat treatment and the nature of the surface can never be optimum for all sub-functions. Frequently the shaft/disc and the shaft/sleeve components are forged. From the forging standpoint, this is fairly complex and expensive because of the flat disc with the thin, long shaft. Moreover, completely new forged components have to be produced every time when producing different embodiments, for example in respect of the thickness and outside diameter of the disc.

Furthermore, in the event of damage to the disc or the shaft, the complete component has to be replaced.

According to the prior art, the cylinders 21 and 27 are, respectively, fixed by a riveted joint to the displaceable disc 5 and by a screwed joint to the displaceable disc 8. The position of the riveted joint and the screwed joint 29 can be changed only by changing the pulley shaft/disc or the sleeve/disc component. This is fairly complex and expensive and, therefore, changes in construction which in themselves are desirable are expensive or avoided.

Figure 2:
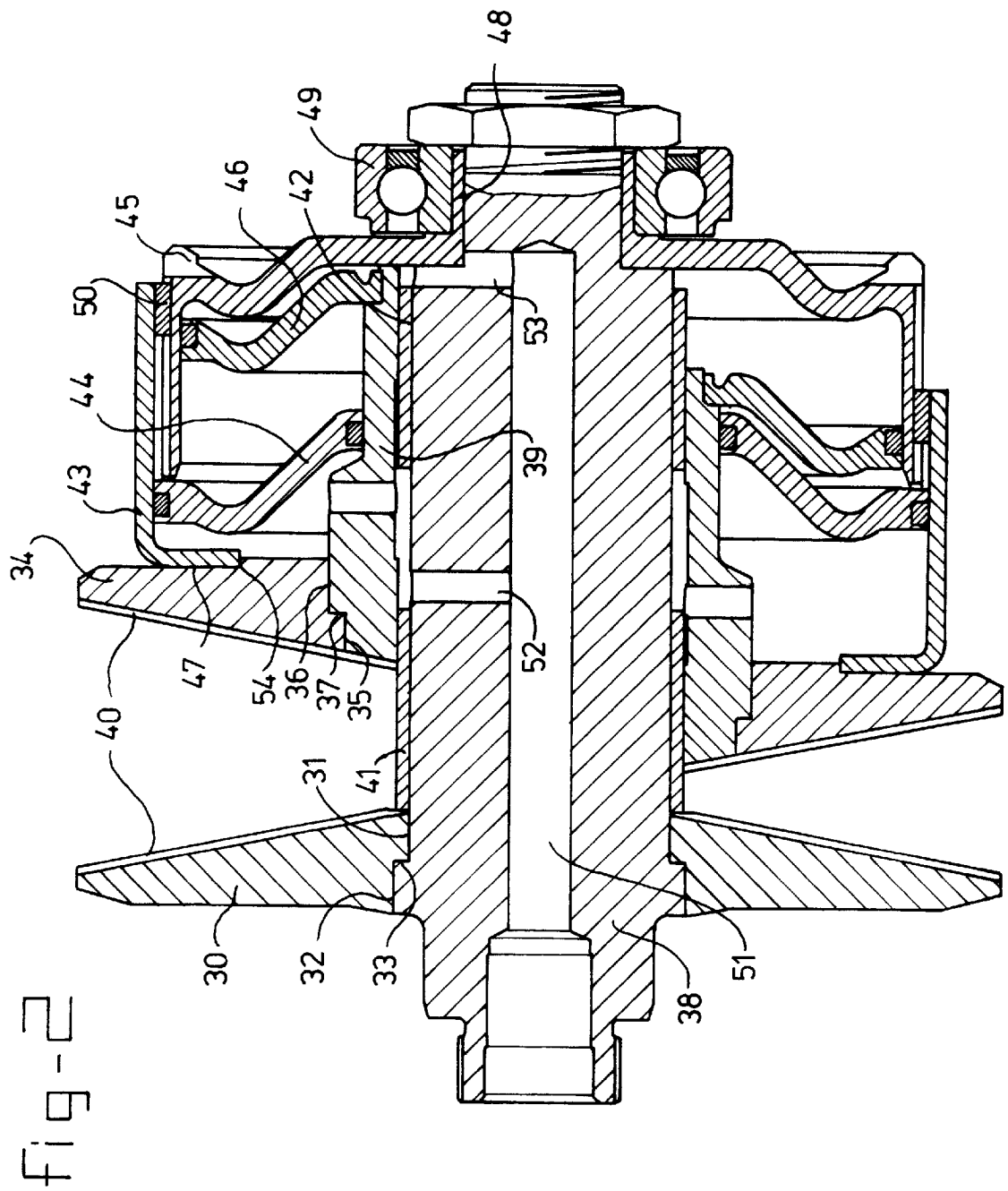
FIG. 2 shows, diagrammatically, a modular pulley according to the invention.

The pulley according to the invention shown in FIG. 2 is of completely modular construction. The disc 30 is fixed as a separate component to the pulley shaft 38 by both a non-positive and a positive connection. The non-positive connection is an adhesive joint and the positive connection is formed by the raised edge 33 between the sides 31 and 32 of the pulley shaft 38.

Figure 3:
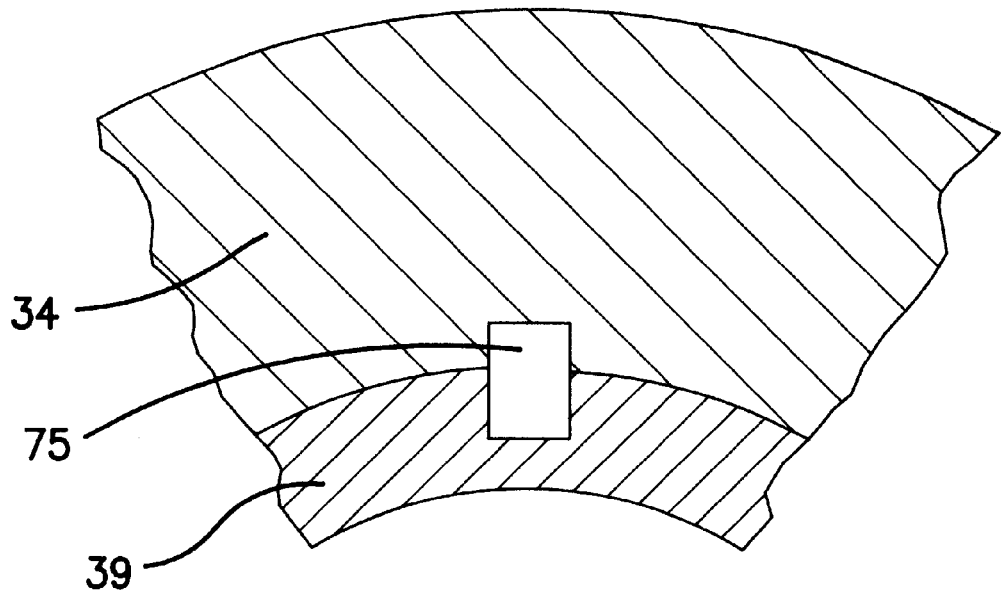
FIGS. 3 and 4 show positive connections between a disc and a sleeve.
Figure 4:
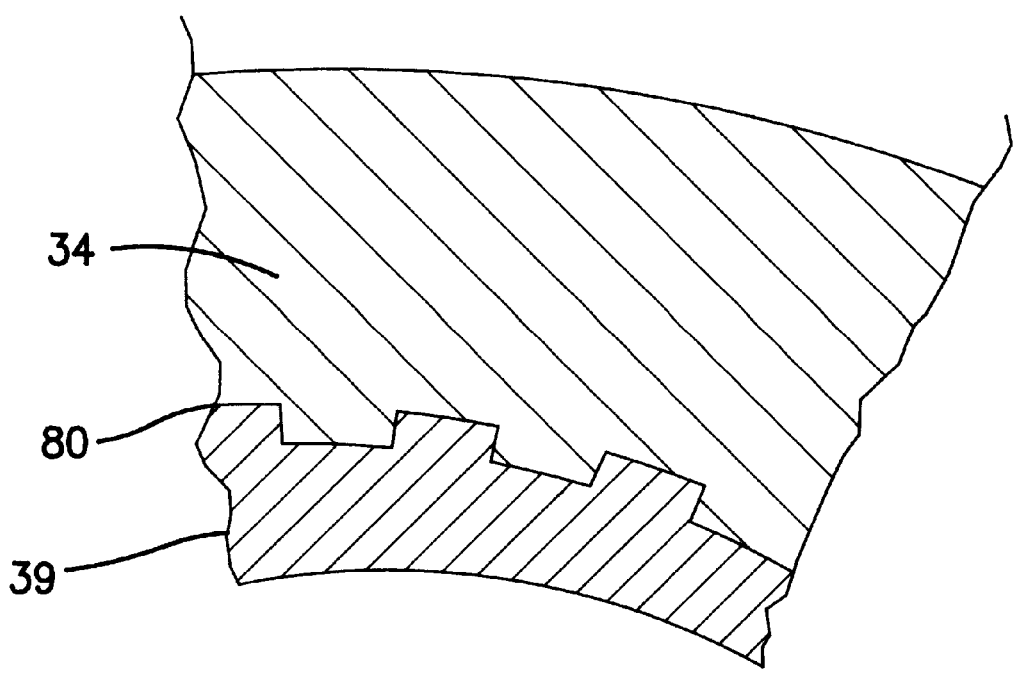

The disc 34 is also fixed as a separate component to the sleeve 39 by both a non-positive and a positive connection. The non-positive connection is once again an adhesive joint and the positive connection is formed by the raised edge 37 between the sides 35 and 36 of the sleeve 39. An alternative key joint 75 is shown in FIG. 3 and alternative toothed joint 80 is shown in FIG. 4.

The two discs 30, 34 are provided with contact surfaces 40 for contact with a drive belt to be accommodated in the pulley, which contact surfaces are individually fixed to the discs and in this case are glued to said discs.

Two individually fixed contact rings 41 and 42 are fixed on the pulley shaft 38, in this case by a press-fit joint, so that, on displacement, the axially displaceable disc 34 slides over the contact surfaces 41 and 42 and not over the shaft 38.

The pulley is provided with a double piston/cylinder assembly 43, 44, 45, 46. The cylinder 43 is individually connected to the disc 34 by means of an adhesive joint. The cylinder 45 is individually fixed by means of an adhesive joint 48 on the pulley shaft 38 and is partially surrounded by the bearing 49. The disc 34 and the pulley shaft 38 are secured against mutual twisting by means of a keyed or toothed joint 50 between the cylinders 43 and 45.

The adhesive joints are preferably strong and elastic so as to be able to absorb both the forces/torques and the deformation. In a number of locations, in particular where the dimensional accuracy has to be high, it is desirable to keep the adhesive joint as thin as possible, preferably no thicker than 10 μm. To preclude environmental effects on the adhesive joint, the adhesive joint can be sealed off, preferably by means of a silicone seal.

In addition to the joints described here, yet further joints are conceivable, in the various locations.

As a result of this modular construction, the various parts can be designed in an optimum manner and the most suitable materials, heat treatments or surface treatments can also be employed. The pulley and the production thereof are thus less complex and less expensive.

The pulley shaft 38 can be optimized for transmitting torque and for transmitting fluid, for example through the holes 51, 52 and 53. The surface of the pulley shaft 38 no longer has to be prepared for guiding the axially displaceable disc 34, because this is effected by the contact rings 41 and 42.

Because the discs 30 and 34 no longer form a whole with the pulley shaft 38 and, respectively, the sleeve 39, the discs can be optimized for transmitting torque and providing the contact force on the drive belt. This is, moreover, further intensified by the use of the contact surfaces 40, which the contact, and in particular the frictional contact, with the belt as a result of a suitable choice of material and nature of the surface for said contact surfaces. The same also applies with respect to the sleeve 39 which forms the other side of the contact. The pulley can, moreover, be designed and produced more simply because the cylinder is simply glued to one side face of the pulley, for which purpose a face 47, optionally with a step 54, is already adequate. Riveted seams or drilled holes are superfluous. Moreover, the disc can then be used for several embodiments without this necessitating changes to the construction. The discs 30, 34 and the pulley shaft 33 can also be replaced individually in the event of damage to one of the two. This additionally provides the possibility of using the pulley shafts and discs in various combinations, for example the same pulley shaft for discs of different thicknesses or outside diameters. It will be clear that the individual production of the pulley shafts and discs is less complicated and therefore less expensive.

Torque transfer from the disc 34 to the pulley shaft is effected via the toothed joint 50 between the cylinders 43 and 45. Because the cylinder 45 is glued to the pulley shaft 38, there is a greater freedom in design and positioning the bearing 49 partially around the cylinder 45 not only strengthens the joint between the cylinder 45 and the pulley shaft 38 but also produces a more compact design.

What is claimed is:

1. A modularly constructed pulley for a continuously variable transmission comprising:
   a first disc immovably and directly attached on a pulley shaft, said first disc and said pulley shaft being designed such that said pulley shaft accepts said first disc as a separate modular component; and
   a second disc immovably attached on a sleeve of said pulley shaft, said second disc being axially displaceable with respect to said shaft, said sleeve forming a support for said second disc and slidingly co-operating with said shaft.

2. The pulley of claim 1, further comprising first contact surface and second contact surface attached to said pulley shaft, wherein said first and said second contact surfaces and said pulley shaft are designed such that said pulley shaft accepts said first contact surface and said second contact surface respectively as separate modular components.

3. The pulley of claim 2, wherein said first and said second contact surfaces are comprised of materials selected based on the operating conditions of said sleeve moving axially over said first and said second contact surfaces during the operation of said pulley.

4. The pulley of claim 2, wherein said first contact surface and second contact surface are attached to said pulley shaft by a press-fit joint.

5. The pulley of claim 1, further comprising a movement means for axially displacing said second disc, wherein said movement means comprises a cylinder-piston assembly immovably attached to said second disc, and wherein said second disc and said cylinder-piston assembly are designed such that said second disc accepts said cylinder-piston assembly as a separate modular assembly.

6. The pulley of claim 5, wherein said cylinder-piston assembly is attached to said second disc by a positive connection.

7. The pulley of claim 6, wherein said positive connection comprises a stepped surface acting as a stop between said second disc and said cylinder-piston assembly.

8. The pulley of claim 1, wherein said second disc is attached to said sleeve by a keyed joint so that said second disc and said sleeve are secured against mutual twisting.

9. The pulley of claim 1, wherein said second disc is attached to said sleeve by a toothed joint so that said second disc and said sleeve are secured against mutual twisting.

10. The pulley of claim 1, wherein said pulley shaft is designed to accept discs of different thicknesses to serve as said first disc so that said pulley may be modularly adapted to particular pulley requirements.

11. A modularly constructed pulley according to claim 10, wherein said sleeve has a radial thickness substantially corresponding to the axial thickness of the second pulley disc.

12. The pulley of claim 1, wherein said said shaft further comprises a dry lube bearing.

13. A modularly constructed pulley for a continuously variable transmission comprising:

a first disc immovably attached on a pulley shaft; and a second disc immovably attached on a sleeve of said pulley shaft, said second disc being axially displaceable with respect to said shaft, said sleeve having a radial thickness substantially equal to an axial thickness of the second pulley disc, forming a support for said second disc and slidingly co-operating with said shaft, wherein said second disc and said sleeve are designed such that said sleeve accepts said second disc as a separate modular component, and wherein said first and second discs extend predominantly radially and said sleeve and shaft extend predominantly axially, and an axial width of a contact surface between said sleeve and said second disc is approximately equal to a thickness of said second disc.

14. The pulley of claim 13, wherein at least one of said first disc and said second disc is immovably attached to said pulley shaft and said sleeve respectively by a non-positive connection.

15. The pulley of claim 3, wherein said non-positive connection comprises an adhesive joint.

16. The pulley of claim 15, wherein said adhesive joint provides a joint which is both strong and elastic.

17. The pulley of claim 15, wherein said adhesive joint is no greater than 10 $\mu$m thick.

18. The pulley of claim 15, wherein said non-positive connection further comprises a sealant applied adjacent said adhesive joint.

19. The pulley of claim 18, wherein said sealant is a silicone sealant.

20. The pulley of claim 13, wherein at least one of said first disc and said second disc is immovably attached to said pulley shaft and said sleeve respectively by positive connection.

21. The pulley of claim 20, wherein said positive connection comprises a stepped surface acting as a stop.

22. The pulley of claim 14, wherein at least one of said first disc and said second disc is immovably attached to said pulley shaft and said sleeve respectively by both a positive connection and a non-positive connection.

23. The pulley of claim 13, wherein said shaft further comprises a dry lube bearing.

* * * * *